Nov. 13, 1928.　　　　　　　　　　　　1,691,688
D. D. WELLS
TOOL HOLDER
Filed July 27, 1925
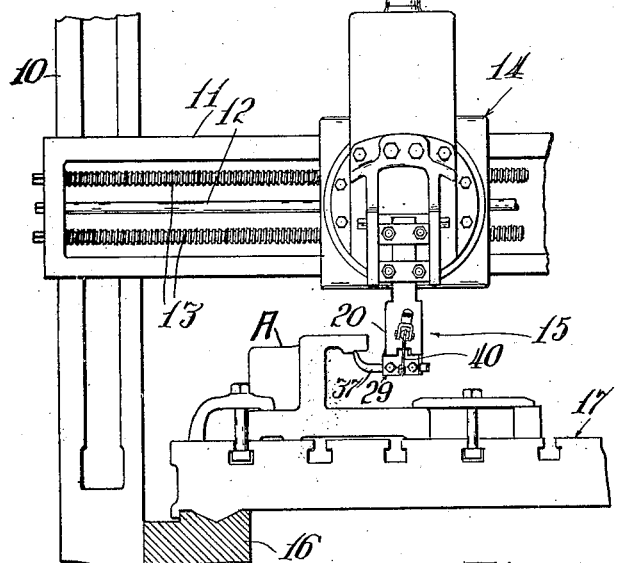
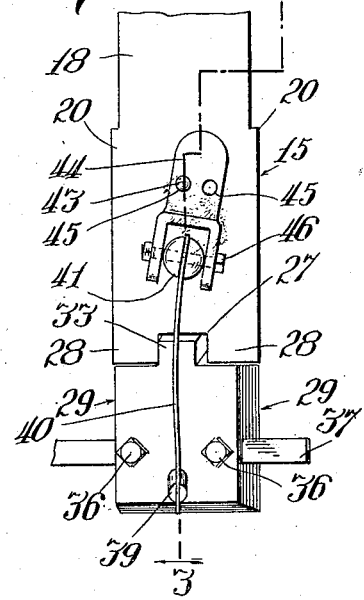
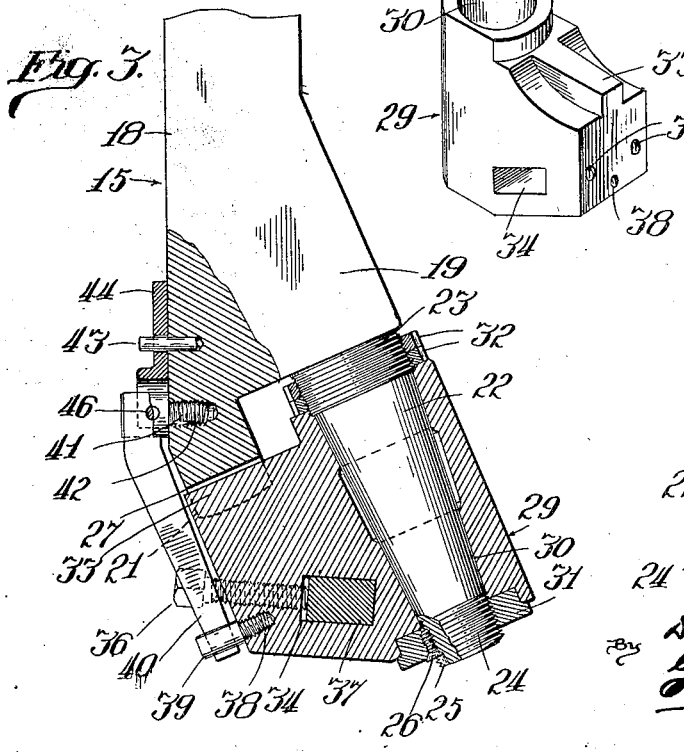
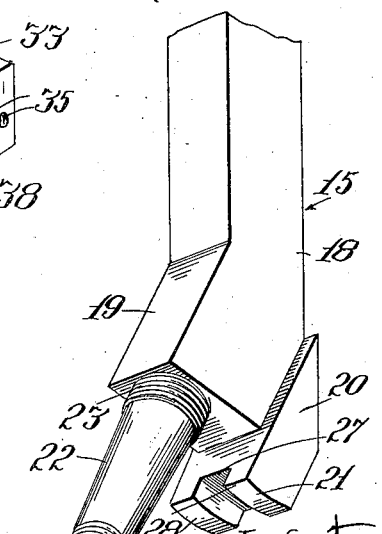

Patented Nov. 13, 1928.

1,691,688

UNITED STATES PATENT OFFICE.

DANIEL D. WELLS, OF ALBUQUERQUE, NEW MEXICO.

TOOL HOLDER.

Application filed July 27, 1925. Serial No. 46,231.

My invention relates to a tool holder for use with metal working machines, namely planers or shapers or other reciprocating machine tools in which metal is machined; and the invention has for its object the provision of means adapted to an interchangeable cutting bit tool holder contemplated for work on any surface that is machined by planers or shapers and more especially in machining surfaces which cannot be reached by the ordinary machine tool, as for example, for undercutting the lower surface of the material being machined, that is to say on the surfaces disposed away from the tool supporting device or tool slide which forms an integral part of the machine tool.

A further object of the invention is to provide means which will enable the under or lower surfaces of the material to be machined without the necessity for any special resetting of the material or work to bring it into the operative path of the bit or tool.

Another object of the invention is to provide a construction of requisite strength, rigidity and durability, and at the same time simple in construction and capable of movement through a predetermined space while at the same time rapidly removing the surplus stock and producing a smooth finished surface.

The objects and advantages of my invention will all be more fully understood and comprehended from the following detailed description of the accompanying drawing, wherein:

Figure 1 is a front elevation of a portion of a planer provided with my improved tool holder.

Figure 2 is an enlarged detail of my improved tool head or holder shown in front elevation.

Figure 3 is a partial side elevation and sectional view taken substantially on the line 3—3 of Figure 2.

Figure 4 is a detail perspective view showing the rear side of the tool head, with the tool holding member removed.

Figure 5 is a detail perspective view of the tool holding member.

In the particular exemplification of the invention as shown in the drawing, it is illustrated applied to a well known type of planer of which only a portion is shown, namely one side of the side guide frame at 10, having the usual cross member 11 with the guide rod 12 and threaded adjusting members or rods 13, with the sliding head 14 which carries the tool head or holder generally indicated at 15. A portion of the bed of the planer is shown at 16 as is also a portion of the reciprocating table at 17, which carries the material or work to be operated on as shown at A in Figure 1.

As my invention relates to the bit or tool holder, a more detailed illustration and description of the machine or planer proper need not be entered into.

My improved holder 15 consists of the main body portion 18, which is securely clamped or bolted to the head 14, is preferably square or rectangular in cross section at the upper end and provided with an enlargement at the rear side as shown at 19; while the lower end is provided with a laterally enlarged portion 20 having a rearwardly inclining surface at 21, Figure 4; the forward lower end of this enlarged portion 20 depending somewhat beneath the plane of the enlargement 19. The enlargement 19 terminates in a depending spindle 22, round in cross section and tapering toward the bottom as shown in Figure 4, with the upper end of the spindle portion 22 threaded at 23, while the lower end is threaded as shown at 24; and this spindle portion 22, like the enlargement 19, extends rearwardly at an angle to the main body portion 18. The lower end of the spindle 22 is slotted eccentrically and threaded as shown at 25 to retain a tapered locking screw 26. The enlargement or boss 20, which may be called the clapper block stop boss, is provided with a groove 27 of suitable width and extending from front to rear so as to provide the depending portions or ears 28, 28; the boss 20 is spaced from the spindle portion 22 as shown in Figure 3.

A tool or bit holding member 29, which may be termed the tool receiving clapper block, has a tapered opening 30 extending from top to bottom adjacent to the rear side of the member and at an inclination and taper corresponding with that of spindle 22; the lower end of the block being provided with a counterbore concentric with the opening 30 to receive a nut 31 which screws onto the threaded lower end of the spindle; while the upper threaded end of the spindle receives the lock nuts 32. The clapper block or tool carrying member 29 at the forward upper end is provided with a projection or tongue 33 which extends into the groove or slot 27 formed in the enlargement or boss 20 of the member 18; the nuts 32 being adjusted so as to maintain a slight spaced relation between the top of the member 29 and the enlargement 19 of the member 18. The block 29 is provided with a tool bit receiving hole 34 of any desired configuration, but preferably rectangular, with the greatest width of dimensions disposed horizontally; the opening or hole 34 being disposed entirely through the block 29. The forward side of the block or member 29, at points substantially in the same horizontal plane as the bit receiving hole 34, is provided with a pair of tapped holes 35, 35 to receive set screws or bolts 36 whereby the tool bit 37 is held in place; and this clapper block 29 at a point substantially in alignment with the projection or tongue 33, is provided with a tapped hole 38 to receive the threaded pin 39 having a split head. The slot in the head 39 is adapted to receive the lower end of the flat clapper spring 40, while the upper end of the spring enters a slot in the spring retaining stud 41 which is threaded into a tapped hole 42 in the stop boss 20, which is also provided with a hole above the hole 42 to receive a spring latch pin 43, whereby the position of a spring holding or latch member 44 is adjusted. The member 44 is provided with a pair of holes 45 in its upper end; one of which is shown receiving the latch pin 43. The lower end of the member 44 is bifurcated and disposed on opposite sides of the stud 41, about which it fulcrums by means of the bolts 46 which pass through the bifurcations and into tapped holes in the sides of the stud 41, disposed at right angles to the slot in the head of the stud; the bolts 46 also serve to hold the clapper spring 40 in place.

With the upper end of the member 44 disposed as shown in Figure 2, namely with the latch pin 43 in the hole 45 to the left in Figure 2, it is apparent that the flat spring 40 will be slightly flexed or placed under tension laterally because of the slight rotation of the stud 41, with the result that the clapper block 29, which may rotate on the spindle 22, will be moved toward the left in Figure 2 so far as the forward side is concerned, thus bringing the tongue 33 thereof against the lug or ear 28 at the left in Figure 2 and thus properly position the cutting tool or bit 37 (having its cutting point or edge turned upwardly as shown in Figure 1) so as to do the desired undercutting on its left side on the lower surface of the material shown at A in Figure 1. If the material to be undercut is located on the opposite or right side of the tool as viewed in Figure 1, it will be understood that the member 44 is then shifted so that the pin 43 enters the hole 45 on the right hand side thereof as viewed in Figure 2.

In operation of my improved tool holder, as the bit 37 (which of course has previously been inserted in opening 34, so as to have its cutting point either project from the left or the right side of the clapper block 29, depending upon the positioning of the material to be operated on or undercut) engages the metal to take or remove a chip, it is held in unyielding position by the clapper block 29 against rearward movement by means of the spindle 22 on which the clapper block 29 is mounted, while the tongue or projection 33 rests firmly against the left lug 28 (in the exemplification shown in the drawing) of stop boss 20; being held in that position by means of spring 40. After the cut has been finished and during the return stroke of the traveling table with the material, namely a backward movement relative to the cutting tool, the frictional contact between the bit or cutting tool and the material worked on causes the cutting bit to move in a direction away from the material and toward the opposite side, namely toward the right in the exemplification as shown in the drawing, such movement being permitted because clapper block 29 is fulcrumed on spindle 22 and because of the play between tongue 33 and the side lugs 28 of the stop block 20; this movement being against the tension of spring 40. This swinging away movement is sufficient to relieve the bit 37 of pressure, except for the slight resistance of spring 40, but which is insufficient to cause any injury to the cutting edge of the bit. With the spindle 22 arranged in the rearwardly depending manner shown, it is also apparent that the movement of the clapper block 29 above mentioned moves the cutting edge of the bit in a somewhat downward direction and therefore permits the downward feed of the material for the next undercut in the manner usual with machines of the type for which my improved tool holder is intended; such downward feed taking place during the rearward travel of the table with the material, the bit thus freeing the material from pressure during such downward movement which is required in undercutting operations. After the material operated on has reached the limit of its return stroke to begin a second cutting operation and the bit is free of the undersurface of the material, the clapper block 29 with the bit will return to normal or cutting position through the action of the spring 40, with the tongue 33 firmly up against the lug 28.

Where the under-cutting is to be on material located to the right of the clapper block 29, it will be understood that a suitable bit for right hand cutting is substituted for bit 37 which is inserted into the clapper black 29 so as to have the cutting edge disposed to the right and the latch member 44 is lifted off of pin 43 and made to pass through the hole 45 to the right of the member 44 as viewed in Figure 2. This flexes spring 40 in the opposite direction from that shown and forces the tongue 33 of clapper block 29 into engagement with the lug 28 at the right in Figure 2, thus positioning the tool for right hand cutting.

The various nuts 31 and 32 are preferably formed with wrench-receiving notches so as to permit adjustment and take-up of any wear that may occur. With my improved holders, the rotative movement of the head or clapper block is limited, which latter, with the cutting tool or bit, is so positioned that the cutting edge of the bit is lead, thereby producing a "draw-cut" effect, which tends to eliminate chatter of the bit on the work; while at the same time providing a universal tool for either right or left cutting operations without necessitating adjustment of any parts other than the reversing operation of the spring control member 44.

With my improved construction, it is also possible to locate the cutting bit very near the lower face, or extension of the head, which, it has been found, is of great advantage when work of a certain type is to be performed.

I have shown what is believed to be a simple adaptation of the invention, which has been described in terms employed merely as terms of description and not as terms of limitation, as structural modifications are possible and may be made without, however, departing from the spirit of my invention.

What I claim is:

1. In a metal working machine, a rigid head portion terminating at the bottom in a rearwardly depending spindle, a bit-holding member journaled on said spindle so as to have lateral swinging movement and disposed forwardly beneath said head portion, the head portion and said member being provided with interengaging surfaces whereby the extent of swinging movement is controlled, and controllable means for yieldingly holding said member in its operative positions.

2. In a metal working machine, a head portion, bit-holding means swiveled on the lower end of said head portion so as to be disposed therebeneath and to move through a laterally inclined arc, said means being arranged at an angle to the longitudinal axis of the head portion, said head portion and means having coacting surfaces whereby the degree of movement of the means is limited, and means for yieldingly maintaining said bit-holding means in normal position.

3. In a metal working machine, a head member having a rearwardly sloping lower portion and spaced apart projections, a bit-holding member swiveled on said sloping lower portion of the head member, the bit-holding member having a transverse bit-holding opening adjacent to its bottom forward of the journal, the upper surface of said bit-holding member being provided with an extension adapted to extend between said spaced projections of the head member whereby the degree of movement of the bit-holding member is controlled.

4. In a metal working machine, a head portion terminating at bottom in a rearwardly sloping tapered spindle threaded at its upper and lower ends, a bit-holding block journaled on said spindle to swing laterally, said block extending forward of the spindle and provided with a transverse bit-holding opening adjacent to the forward lower end, means threaded on the spindle above and below said block for taking up wear between the block and head portion, and a pair of abutting lugs on the head portion adapted to engage the forward upper end of the block to limit its swinging movement.

5. In a metal working machine, a head member having a rearwardly sloping lower projection, a bit-holding block journaled on said sloping lower projection so as to be disposed beneath the main member and to permit lateral swinging movement of said block, said block being provided with a bit-holding opening arranged in a plane rearwardly of the vertical axis of said head member, coacting surfaces on the head member and the block for limiting the swinging movement of the block 1, and means whereby said block is removably secured in place and adjustment thereof permitted.

6. In a metal working machine, a head member having a rearwardly sloping spindle portion, a bit-holding block journaled on said spindle portion so as to be disposed beneath the head member and to move through an arc of a circle, said block being provided with a bit-receiving opening disposed in a plane rearward of the vertical axis of said head member, means whereby said block is removably secured on the spindle and adjustment thereof permitted, means for limiting the swinging movement of said bit-holding block, and means for yieldingly holding the block in normal positions.

7. In a metal working machine, a head member having a rearwardly depending spindle, a bit-holding block journaled on said spindle so as to be disposed beneath the forward portion of said head member and to swing through an arc of a circle, means for limiting the movement of said block, and adjustable yielding means whereby the normal position of said block relative to the vertical plane of the head member is determined.

8. In a metal working machine, a head member having a rearwardly depending spindle, a bit-holding block journaled on said spindle so as to be disposed beneath the main portion of said head member and to swing through an arc of a circle, a spring having a fixed relation with said block and an adjustable relation with said head member so as to normally force the block toward the bit cutting side.

9. In a metal working machine, a head member having a rearwardly depending spindle portion, a bit-holding block journaled on the spindle portion so as to be disposed beneath the head member and to swing through an arc of a circle about said spindle, means for securing the block adjustably on the spindle, a bracket member pivotally secured to said head member so as to permit vertical swinging movement thereof, and a spring secured to said bracket member and to said block whereby the normal position of the latter is controlled.

10. In a metal working machine, a head member provided with a rearwardly depending spindle, a bit-holding member mounted on the spindle so as to swing laterally, said last member having a tool-receiving opening adjacent to the lower forward face thereof, means for limiting the swinging movement of the bit-holding member, adjustable means carried by the head member for yieldingly holding the bit-holding member in operating position, and means for removably and adjustably securing said bit-holding member on said spindle.

11. In a metal working machine, a head member provided with a rearwardly depending spindle and with spaced projections on the lower forward face thereof forward of the spindle, a bit-holding block journaled on said spindle so as to be disposed beneath the head member and to swing laterally through an arc of a circle about said spindle, a projection on the upper surface of said block adapted to coact with the projections on the lower surface of said head for limiting the swinging movement of said block, means for securing the block adjustably on the spindle, a bracket member pivotally secured to said head member so as to permit vertical swinging movement thereof, and a spring, one end whereof is operatively connected with said bracket member while the other end is secured to said bit-holding block whereby the normal position of said block is controlled.

DANIEL D. WELLS.